April 17, 1962     A. I. APPLETON     3,030,129
HIGH PRESSURE FITTING FOR FLEXIBLE CONDUITS
Filed June 16, 1958     2 Sheets-Sheet 2
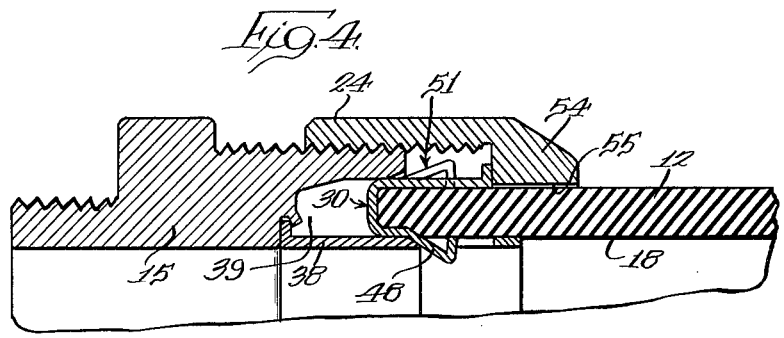
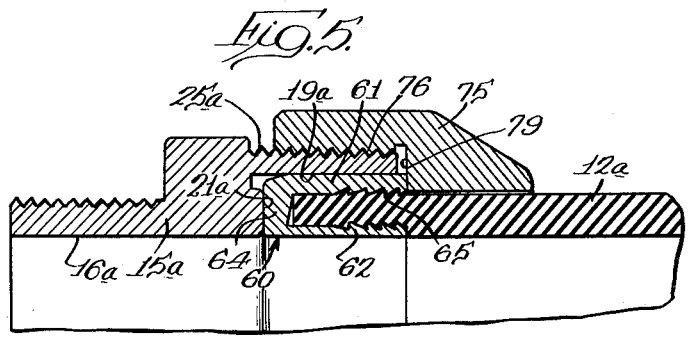
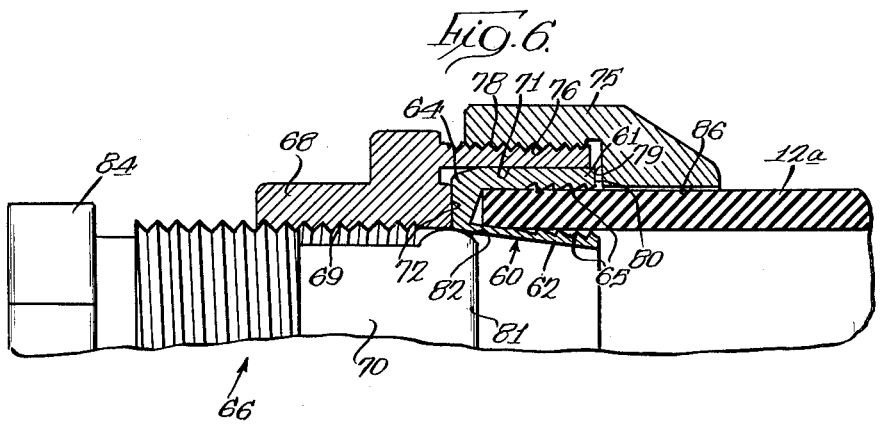
INVENTOR.
Arthur I. Appleton
BY
Carlson, Pitzner, Hubbard & Wolfe
Attys.

United States Patent Office 3,030,129
Patented Apr. 17, 1962

3,030,129
HIGH PRESSURE FITTING FOR FLEXIBLE
CONDUITS
Arthur I. Appleton, Northbrook, Ill. (% Appleton Electric Co., 1713 Wellington Ave., Chicago 13, Ill.)
Filed June 16, 1958, Ser. No. 742,367
1 Claim. (Cl. 285—248)

The present invention relates to fittings for use with flexible resilient conduits capable of carrying high pressure fluid. More particularly, the present invention relates to conduit fittings providing a fluid-tight connection with conduit formed of yieldable materials, such as rubber and plastic, and with a metal fitting body mounted on a high pressure chamber wall thereby providing a high pressure fluid-tight connection between the conduit and the high pressure chamber.

The primary aim of the present invention is to provide a new and improved conduit fitting of the above character which gives a strong, secure, leak-proof coupling yet which is economically and readily manufactured. Another object of the invention is to provide a tubing fitting having the above characteristics which will give a strong, high pressure, leak-proof connection, which is easily utilized, and which requires no particular skill in assembling.

A further object of the present invention is to provide a fitting affording a good connection even under conditions of stress and vibration, which is strong and reliable, and which securely grips the tubing to prevent it from being blown out when high pressures are applied within the tubing. Still a further object is to provide a fitting of the above character which accommodates slight variations in tubing diameters.

A more detailed object of the present invention is to provide a fitting of the above character having an inner thimble providing a fluid-tight connection between a flexible, resilient conduit and a metal fitting body mounted in communication with a high pressure chamber. A further object is to provide a fitting of the above type wherein said thimble tightly and securely engages the conduit so that the conduit will not be blown out of the fitting by the high pressure fluid.

Other objects and advantages of the present invention will become apparent as the following description proceeds, taken in connection with the accompanying drawings wherein:

FIG. 4 is a view similar to FIG. 2 showing a modified form of fitting thimble.

FIG. 5 is a fragmentary section view of still another modified form of fitting illustrative of the present invention.

FIG. 6 is a fragmentary section view of a fitting of the type shown in FIG. 5 illustrating the use of a tool for securing a thimble onto one end of a flexible tube.

Figure 1:
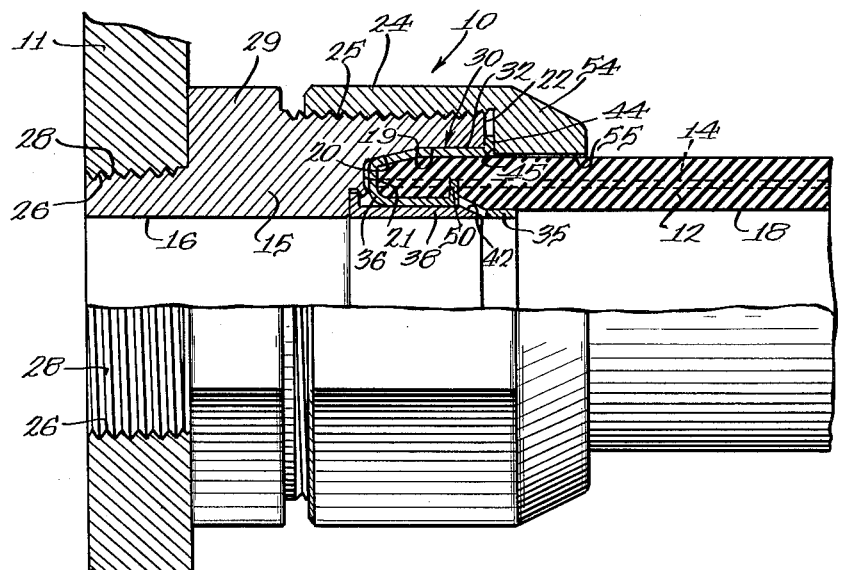
FIGURE 1 is a side view, partly in section, of a high pressure fitting illustrative of the present invention mounted in place on a wall or the like and securing a flexible hose thereto.

While certain illustrative forms of high pressure fluid-tight fittings are shown in the drawings and will be described below in detail, it should be understood that there is no intention to limit the invention to the specific forms disclosed. On the contrary, the intention is to cover all modifications, alternative constructions, equivalents, and uses falling within the spirit and scope of the invention as expressed in the appended claim.

For purposes of illustrating the invention, there is shown in the drawings a fitting 10 illustrative of one form of the present invention mounting a flexible, resilient conduit 12, made of rubber, neoprene, plastic or the like, in communication with an aperture in one wall 11 of a high pressure chamber or housing. The conduit 12 may, if desired, be reinforced with an annular metallic core member 14 when high pressure fluid is to be employed therein. While the fitting is shown in threaded engagement with a wall 11 it will be understood that any suitable pressure tight means may be employed for mounting the fitting on the wall.

The fitting 10 comprises a body 15 having a bore 16 therethrough which is substantially equal in diameter to the bore 18 of the tubing 12. For receiving an inserted end of the tubing the body 15 is formed at its outer end with a counterbore 19 shaped with an inwardly sloping annular seat 20 terminating in an abrupt annular shoulder 21 extending radially from the main bore 16. At its outer or open end the counterbore 19 terminates in a radially extending annular end surface 22. Surrounding the counterbore 19 for engaging a clamping nut 24 is a threaded portion 25. The body is engaged at its inner end with a threaded aperture 26 in the wall 11 by suitable threads 28, an external wrench flange 29 is provided for use in turning the body 15 into the threaded wall aperture, or any other appropriate means may be used for securing the fitting body in fluid-tight relation on the wall of the pressure chamber or housing.

Figure 3:
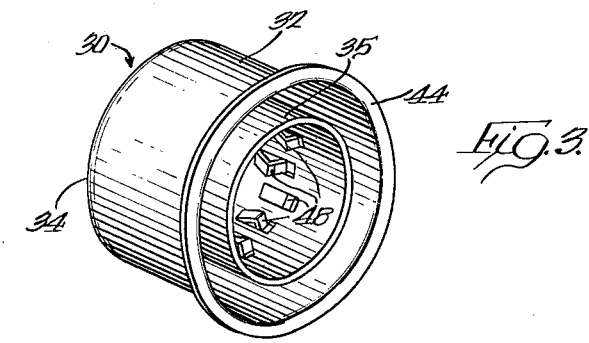
FIG. 3 is a thimble forming a part of the fitting shown in FIGS. 1 and 2 useful for mounting flexible tubing in a high pressure fluid-tight fitting.

In accordance with the present invention, for engaging the conduit with the fitting in a fluid pressure tight relation and for preventing the conduit from being blown out of the fitting upon the application of high pressures, there is provided an annular ferrule or thimble 30 (FIG. 3) surrounding an inserted end of the conduit 12 and adapted to be forceably inserted into the counterbore 19 into sealing engagement with an annular seat 20 therein and thereby deformed into sealing and gripping engagement with the conduit. One illustrative form of thimble is shown in FIG. 3 and comprises an outer sleeve portion 32 having, at its inner end, an inwardly directed radial flange or web 34 adapted for sealing engagement with the tapering seat 20 in the counterbore. Concentric with the outer sleeve member 32 is an inner sleeve member 35 integrally joined with the web 34 by means of a rounded portion 36. Engagement of the outer sleeve 32 with the annular tapering seat 20 in the counterbore is by metal-to-metal rubbing contact, thereby establishing an effective fluid-tight seal between the conduit and the fitting body.

Figure 2:
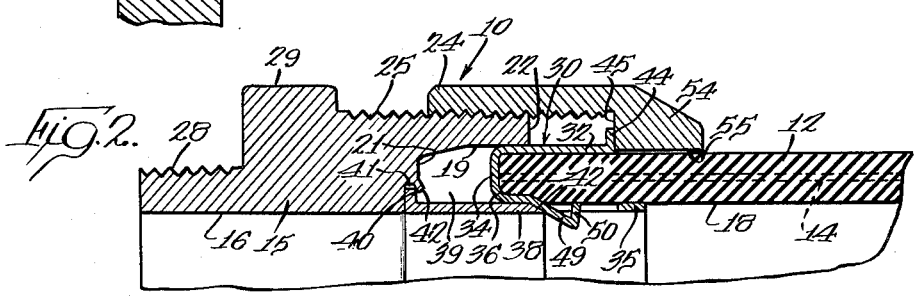
FIG. 2 is a fragmentary section view of a fitting of the type shown in FIG. 1 with the elements partially assembled.

When a ferrule 30 of the type shown in FIG. 3 is employed, means are desirably provided in the fitting body to engage the inner sleeve member 35 of the ferrule and compress it tightly against the inserted end of the conduit 12. One illustrative means for accomplishing this is shown in FIGS. 1 and 2 and comprises an internal sleeve 38 fixed within the counterbore 19 and defining therewith an annular chamber 39 for receiving the inserted thimble 30. The sleeve 38 is mounted coaxially with the counterbore and with the main bore 16 by any suitable means. For example, the sleeve may be secured to the shoulder 21 by means of an annular flange 40 on the inner end of the sleeve which is received in a notch 41 in the shoulder 21 in the body and held thereto by an annular tab 42 which is peened over and against the flange 40. The internal sleeve 38 has an inner diameter which is substantially equal to the diameter of the main bore 16 so that a continuous smooth surface with a minimum of obstruction is provided through the fitting. The outer diameter of the sleeve is therefore slightly larger than the inner diameter of the conduit bore 18 and, by the same token, is somewhat larger than the inner diameter of the sleeve portion 35. The ferrule, then, must be forceably inserted into the annular chamber 39, and when so forceably inserted, will be deformed to tightly squeeze the contained inserted end of the conduit. This squeezing action is highly effective in providing a fluid-tight high pressure seal between the conduit and the thimble.

To facilitate insertion of the thimble 30 into the annular chamber 39 defined by the counterbore 19 and sleeve 38, the outer end of the sleeve 38 is provided with an extrenal tapering annular surface 42. In addition to facilitating insertion of the thimble, this surface provides a smooth transition between the conduit bore and the fitting bore and minimizes obstruction of the conduit bore when the thimble is mounted in place in the fitting.

In order to forceably urge the thimble 30 into an annular chamber 39 so that the inner sleeve 35 is compressed tightly against the conduit, there is formed on the outer end of the outer sleeve member 32 an outwardly extending radial abutment or flange 44 engageable by an annular shoulder 45 in the nut 24. As the nut 24 is tightened on the body by engagement with the threads 25, the shoulder 45 abuts the flange 44 and forces the outer sleeve 32 and thimble 30 into the annular chamber 39. As the thimble 30 is forced into the annular chamber 39, the surface of the outer sleeve 32 engages the sloping seat 20 with a rubbing metal-to-metal contact. At the same time the inner sleeve member 35 is expanded tightly against the inner surface of the conduit bore 18. During the final stages of seating, the outer sleeve portion 32 is deformed inwardly by the sloping seat 20. The action of deforming the thimble severely compresses it around the conduit end and thereby provides an essentially leakproof, high pressure, fluid-tight coupling between the conduit, thimble and fitting body.

When the nut has been completely tightened on the fitting body, the thimble is seated in the annular chamber and the flange 44 on the outer end of the thimble engages the outer face 22 of the body. If desired, the flange 44 and outer face 22 may be correspondingly tapered to provide a wedging seal therebetween.

In order to prevent the conduit from being forced out of the thimble, should high pressure fluid leak around the inner sleeve 35, means are provided on the thimble for positively engaging and gripping the conduit. One such positive engaging means is shown in FIGS. 1–4 and comprises a plurality of claw-like members 48 (FIG. 3) struck radially inwardly from the inner sleeve 35. These claw members 48 comprise a tongue portion 49 fixed at one end to the inner sleeve and are formed with a free end 50 bent radially outward towards the outer sleeve 32. The conduit is gripped by forcing the claws outwardly so that the free end 50 digs into the conduit wall and securely holds the conduit against axial withdrawal of the fitting. The claw members 48 are preferably circumferentially spaced around the inner sleeve in alternately staggered rows as shown in FIG. 3. To prevent weakening of the conduit, the free ends of the claws must, of course, be of a length less than the thickness of the conduit wall so that they do not pierce the wall. Preferably, these tongues are of a length equal to about half of the wall thickness.

For deforming the claws into biting engagement with the conduit, they are engaged by the sleeve 38 as the thimble is forced into the annular chamber 39 and are bent outwardly to bite into the conduit wall. At the same time, the inner sleeve is compressed against the conduit and the combination of this sleeve compression and the biting engagement of the claws results in an exceptionally strong fluid-tight coupling.

If desired, a similar set of claws 51 may be provided on the outer sleeve as shown in FIG. 4. These outer claws are constructed in the same manner as the inner claws 48 described above, and will be forced to dig into the outer surface of the conduit wall by their engagement with the surface of the counterbore 19. It will be appreciated that the conduit thickness must be such that the claws will not penetrate entirely through the wall.

Accordingly, the modification shown in FIG. 4 will be used for thicker walled conduit where there is no danger of the claws penetrating through the wall and where the use of the claws is desired to prevent the conduit and fitting from separating under exceptionally high fluid pressures.

In order to provide support for the conduit at a point spaced from the thimble to protect the conduit from being cut or torn upon flexure relative to the fitting, the nut 24 is formed with an extending sleeve portion 54 defining a bore 55 which closely surrounds the conduit 12.

As an alternative form of fitting for use with the larger tubing sizes having heavy walls, still another fitting modification is shown in FIGS. 5 and 6. In this modification, an extra heavy thimble is provided for compressing and tightly engaging the conduit and for gripping the conduit wall to prevent separation of the fitting and conduit under high fluid pressures. The modified thimble shown in FIGS. 5 and 6 instead of being fabricated from thin brass stock as is the thimble shown in FIGS. 1–4, is cast from a ductile metal and is secured on an inserted end of the conduit by means of an appropriate tool. With this modification it is possible to eliminate the necessity of an inner body sleeve defining an annular chamber for receiving the thimble. In describing this modification reference characters similar to those used above will be employed where applicable with the distinguishing suffix "a."

The modified fitting comprises a cast thimble 60 having a pair of relatively heavy inner and outer sleeves 61, 62 respectively, joined at one end by a web portion 64 and thereby defining an annular thimble opening for receiving an inserted end of a conduit 12a.

For biting into the surfaces of the conduit wall and holding the conduit against axial forces tending to pull it out of the thimble, such as high pressure fluid which may be between the conduit, the sleeves 61, 62 are provided with a series of conduit engaging teeth 65.

The thimble is clamped securely to the conduit 12a so that the teeth 54 bite into the conduit by the use of a form of spinning tool 66. The tool 66 when inserted within the thimble is rotated to spin or force the sleeve members of the thimble tightly against the conduit wall and thereby compress the wall between the sleeves and cause the teeth to bite into the conduit. One illustrative tool for clamping the thimble to the conduit is shown in FIG. 6 and comprises a body 68 having a threaded bore 69 for threaded engagement with a spindle 70. For receiving the thimble 60 the body 68 is formed on the end thereof remote from the spindle threads 69 with a counterbore 71 terminating in an abrupt internal annular shoulder 72 engageable with the web 64 of the thimble. The thimble is held within the body by means of a nut 75 having threads 76 engageable with corresponding threads 78 surrounding the counterbore 71 and having a radial annular shoulder 79 for engaging the outer end surface 80 of the outer thimble sleeve 61. The nut 75 will necessarily be the nut used for subsequently attaching the conduit and thimble to a fitting body.

In order to spin or deform the inner sleeve outwardly against the conduit 12a, the spindle 70 is provided with a spinning head 81 having a smooth rounded sleeve engaging surface 82 extending laterally therefrom into engagement with the inner surface of the thimble. On the opposite end of the spindle from the spinning head there is provided a wrench engaging surface 84. By threading the spindle into the body 68, the face 82 of the spinning head 81 engages the inner sleeve 62 and compresses it tightly against the conduit 12a, tightly squeezing the conduit and engaging the teeth 65 in its walls. Once the thimble 60 has been tightly secured to the conduit 12a, the assembly is inserted into a fitting body of the type described above.

An illustrative fitting for use with the above described tool mounted thimble is shown in FIG. 5. This fitting is substantially the same as described above and includes a bore 16a corresponding to the inner bore of the conduit. For receiving the conduit and attached thimble, the body is formed with a counterbore 19a terminating in an abrupt shoulder 21a extending radially from the main bore 16a and adapted for sealing engagement with the web 64 of the thimble. Surrounding the counterbore are threads 25a engageable with corresponding threads 76 on the nut 75 used for clamping the conduit and thimble to the body. The nut, as described above, is provided with an internal shoulder 79 for engaging the outer face 80 of the thimble. As the nut is tightened on the body, the thimble is forced into the counterbore 71. By making the counterbore slightly smaller than the thimble, the latter will be further squeezed against the conduit as well as sealingly mounted in the body.

As described above, the nut is formed with a conduit supporting bore 86 extending around the conduit in close fitting engagement therewith. It is, of course, necessary to insert the nut onto the conduit prior to the fastening of the thimble, and as mentioned above, the nut 75 employed with the tool 66 is the nut eventually used to secure the conduit to the fitting.

With all of the above described modifications it can be seen that the conduit is tightly engaged and compressed by the thimble and is positively held against axial withdrawal by the claws which bite or dig into and grip the conduit. The thimbles carrying the gripping means are sealingly tightened into the fitting by the fitting nut and a high pressure seal is thereby provided between the fitting, the conduit, and the chamber or housing on which the fitting is mounted.

I claim as my invention:

A separable conduit fitting for attaching a yieldable resilient conduit to a housing wall, said fitting comprising a body member mounted on said wall, said body member having a main bore substantially equal to the conduit bore and said body member having a counterbore at one end thereof surrounding said main bore, a sleeve having a bore substantially equal to said main bore fixed at one end within said body and extending within said counterbore to define an annular chamber therewith, the free end of said sleeve having an external tapered surface thereon, and external threads on said body disposed in surrounding relation with the annular chamber and said tapered surface; an annular thimble receiving an inserted end of the conduit and comprising an outer sleeve member surrounding the conduit, an inner sleeve member inserted into the conduit and having an inner diameter smaller than the outer diameter of said sleeve, an annular radially extending web portion joining inner ends of said outer and inner sleeve members, an annular flange extending radially outwardly from the outer end of said outer sleeve member, and a plurality of staggered, circumferentially disposed tongues struck radially from at least one of said sleeve members and having a free end shaped to form a prong directed radially towards the inserted conduit, said prongs being deformed into biting engagement with the conduit to prevent withdrawal of the same from the thimble; and an annular sealing nut comprising a sleeve portion having a bore receiving and supporting the conduit, said sleeve portion also having an internally threaded counterbore engaging said external body threads, and an annular shoulder between said bore and counterbore engaging said outwardly extending thimble flange; whereby as said nut is tightened onto said body member said nut shoulder engages said annular flange on said thimble and forces said thimble into said annular chamber so that said thimble sleeve members are squeezed tightly against the inserted end of the conduit and said prongs are deformed into biting engagement with the conduit to grip the same, and prevent withdrawal from the fitting.

References Cited in the file of this patent
UNITED STATES PATENTS

| | | |
|---|---|---|
| 199,349 | Caswell | Jan. 2, 1878 |
| 2,008,650 | Weatherhead | July 16, 1935 |
| 2,044,335 | Schulthess | June 16, 1936 |
| 2,090,250 | Cowles | Aug. 17, 1937 |
| 2,142,768 | Tompkins | Jan. 3, 1939 |
| 2,216,839 | Hoffman | Oct. 8, 1940 |
| 2,228,018 | Scholtes | Jan. 7, 1941 |
| 2,280,892 | Cowles | Apr. 28, 1942 |
| 2,314,000 | Lusher | Mar. 16, 1943 |
| 2,321,260 | Stecher | June 8, 1943 |
| 2,457,633 | Borg | Dec. 28, 1948 |
| 2,782,060 | Appleton | Feb. 19, 1957 |

FOREIGN PATENTS

| | | |
|---|---|---|
| 101,231 | Switzerland | Sept. 17, 1923 |
| 607,470 | Great Britain | Aug. 31, 1948 |
| 1,075,106 | France | Apr. 14, 1954 |
| 530,041 | Belgium | July 15, 1954 |
| 957,490 | Germany | Feb. 7, 1957 |